United States Patent
Wu et al.

(10) Patent No.: US 6,858,831 B2
(45) Date of Patent: Feb. 22, 2005

(54) MEASUREMENT APPARATUS FOR MEASURING OPTOELECTRONIC CHARACTERISTICS OF ORGANIC LIGHT EMITTING DIODE

(75) Inventors: Ming-Hsin Wu, Taoyuan Hsien (TW); Ju-Chung Chen, Taipei Hsien (TW); Shu-Shin Lin, Yunlin Hsien (TW); Yen-Lin Wang, Miaoli Hsien (TW)

(73) Assignee: RiTdisplay Corporation, Hsinchu (TW)

( * ) Notice: Subject to any disclaimer, the term of this patent is extended or adjusted under 35 U.S.C. 154(b) by 118 days.

(21) Appl. No.: 10/248,690

(22) Filed: Feb. 10, 2003

(65) Prior Publication Data
US 2004/0155173 A1 Aug. 12, 2004

(51) Int. Cl.⁷ ................................................. H01J 40/14
(52) U.S. Cl. ....................................... 250/215; 356/213

(58) Field of Search .......................... 250/215; 356/213; 327/514; 257/40

(56) References Cited

U.S. PATENT DOCUMENTS 4,414,476 A * 11/1983 Maddox et al. ......... 250/559.37
2003/0010892 A1 * 1/2003 Clark ....................... 250/208.1

* cited by examiner

Primary Examiner—Stephone B. Allen
Assistant Examiner—Patrick J. Lee
(74) Attorney, Agent, or Firm—Jiang Chyun IP Office

(57) ABSTRACT

An apparatus for measuring optoelectronic characterstics of an organic light emitting diode, comprising a computer, a power supply and a cavity. The cavity comprises a tooling, on which at least one photodiode is mounted. The computer is used to control the power supply for lighting up the organic light emitting diode, so as to control the optoelectronic characteristic measuring equipment for measuring a brightness generated by the organic light emitting diode. Thereby, the automatic measurement is attained.

12 Claims, 3 Drawing Sheets internal allocation of tooling 108

MEASUREMENT APPARATUS FOR MEASURING OPTOELECTRONIC CHARACTERISTICS OF ORGANIC LIGHT EMITTING DIODE

BACKGROUND OF INVENTION

1. Field of the Invention

The invention relates in general to an optoelectronic measurement apparatus, and more particularly, to an apparatus for measuring optoelectronic characteristics of an organic light emitting diode.

2. Related Art of the Invention

OLED, organic light emitting diode, or organic light emitting display, is a kind of flat panel display that converts electricity into optoenergy with a high conversion efficiency. The common application of OLEDs includes cellular phone, personal digital assistant (PDA), and light sources for various flat panel displays. Having the characteristics such as wide viewing angle, simple fabrication process, low cost, fast response speed, broad range of application temperature, and full color, OLED meets the requirement of displays in the multi-media era and becomes a popular research topic in industry.

Normally, after an organic light emitting diode is fabricated, temperature, humidity and optoelectronic tests are performed thereon. That is, the organic light emitting diode is disposed in a high temperature, high humidity or high temperature and humidity environment to test the optoelectronic characteristics thereof. The testing method is described as follows.

OLED is disposed in a constant temperature and a constant humidity test machine (such as the machine GTM-225-40-1P). A high temperature, high humidity or high temperature and humidity condition is applied to the constant temperature and humidity test machine. For every period of time (for example, every four hours, eight hours or twenty-four hours), the Constant temperature and humidity machine is switched off. OLED is then manually removed from the constant temperature and humidity test machine after the temperature therein is reduced. A power supply for supplying lit-up current of the OLED is applied, and optoelectronic measurement equipment (such as SR-2, BM-7 or BM-5) is used to measure the brightness variation of the OLED. According to the data of brightness variation manually measured by the optoelectronic measurement equipment, the data are then input to a computer for further process.

In the conventional measurement equipment, the constant temperature and humidity test machine, the power supply and the optoelectronic measurement equipment are three unrelated apparatuses. Therefore, the OLED has to be manually removed from the constant temperature and humidity test machine, and the optoelectronic characteristics thereof are then measured using the optoelectronic measurement equipment. As a result, the high temperature and humidity test is affected consequently and further affect the measurement accuracy. Further, as the OLED is not removed until the temperature of the constant temperature and humidity test machine is reduced, waiting time for increasing and reducing temperature is consumed. In addition, the conventional measurement equipment requires manually removing the OLED from the constant temperature and humidity test machine, manually recording the measurement data, and manually inputting the data into the computer. The conventional measurement equipment is thus very laborious.

Further, manually placing and removing the OLED in and out of the constant temperature and humidity teat machine could easily injure the operator when improper operation should occur.

SUMMARY OF INVENTION

The present invention provides an apparatus for measuring optoelectronic characteristics of an organic light emitting diode that uses automatic measurement to replace the conventional manual measurement process, such that the labor cost is saved.

The present invention provides an apparatus for measuring optoelectronic characteristics of an organic light emitting diode which improves the inaccurate measurement obtained by the conventional measurement equipment.

The present invention provides an apparatus for measuring optoelectronic characteristics of an organic light emitting diode to save the waiting time for temperature increase and decrease required for using the conventional measurement equipment.

The apparatus for measuring optoelectronic characteristics of an organic light emitting diode includes a computer, a power supply and a cavity. The cavity further comprises a tooling on which at least one photodiode is mounted. An organic light emitting diode is disposed on the tooling disposed in the cavity. A high temperature, high humidity or high temperature and humidity condition is applied to the cavity. The computer is used to control the power supply for supplying a constant current, voltage or other condition. Meanwhile, a brightness of the light generated by the organic light emitting diode is measured by the photodiode within the tooling. The photodiode generates a signal reflecting the brightness measured thereby and the signal is delivered to the computer to perform data process. In the present invention, the computer is configured to control the power supply for providing a constant current, voltage or other condition to light up the organic light emitting diode once every while, while the brightness of the light generated by the organic light emitting diode is monitored by the photodiode.

The apparatus for measuring optoelectronic characteristics of an organic light emitting diode provides automatic measurement, such that the labor cost is reduced.

Using the apparatus provided by the present invention, the organic light emitting diode is not moved in and out of the test machine during measurement, such that the waiting time for temperature rise and drop is saved.

Without moving the organic light emitting diode in and out of the test machine during measurement, the measurement accuracy is enhanced.

BRIEF DESCRIPTION OF DRAWINGS

These, as well as other features of the present invention, will become more apparent upon reference to the drawings wherein.

DETAILED DESCRIPTION

Figure 1:
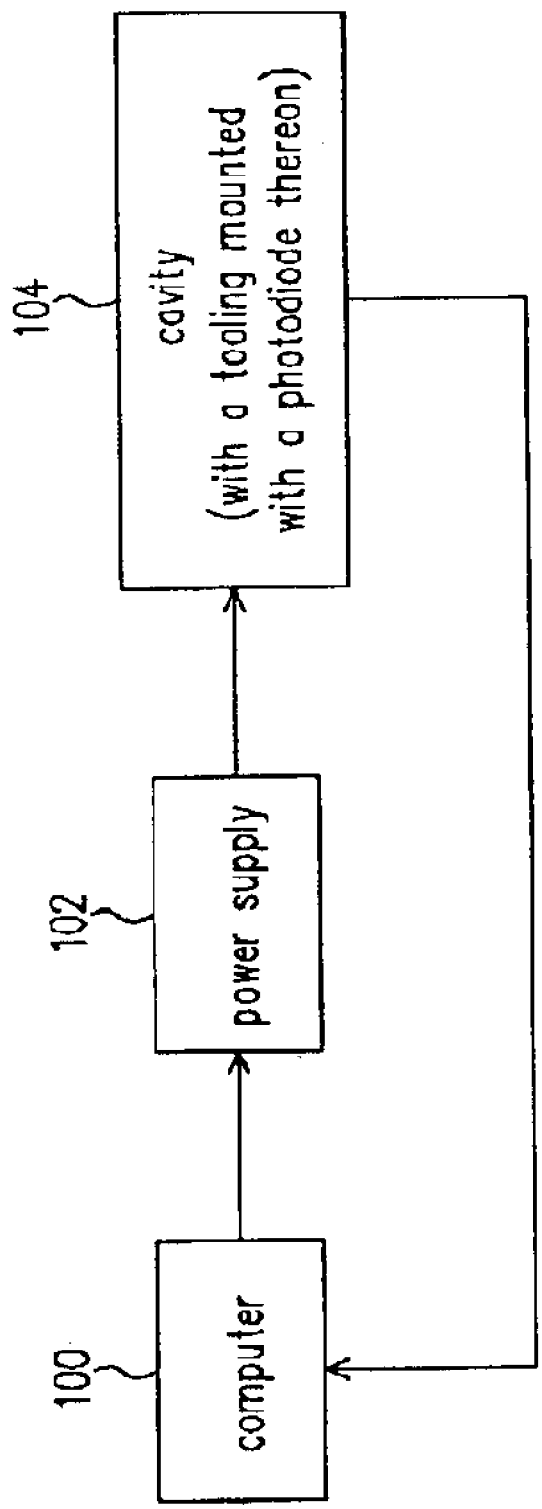
FIG. 1 is process flow of a method for measuring optoelectronic characteristics of an organic light emitting diode according to the present invention.
Figure 2:
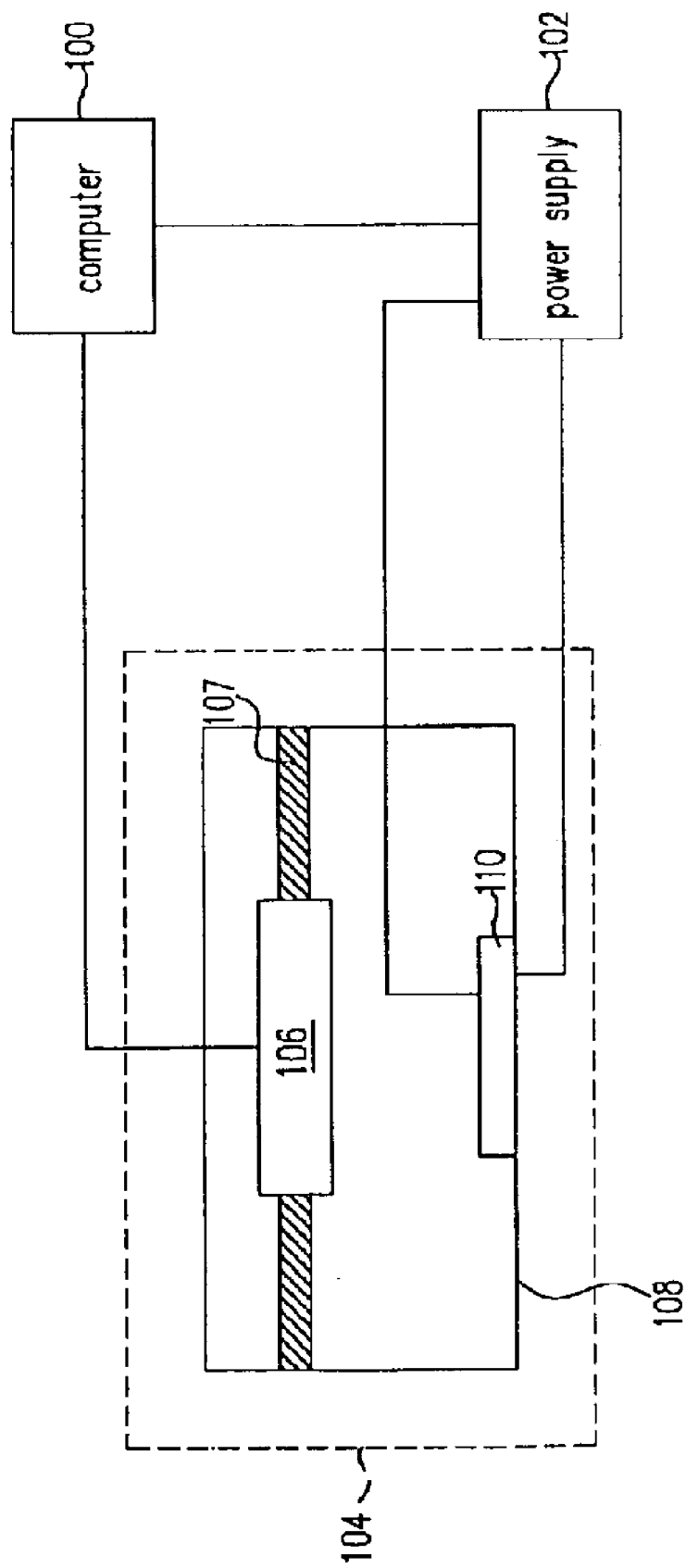
FIG. 2 shows a schematic allocation of an apparatus for measuring optoelectronic characteristics of an organic light emitting diode according to the present invention.

FIG. 1 is a process flow showing a method for measuring optoelectronic characteristics of an organic light emitting diode, and FIG. 2 shows the allocation of an apparatus for measuring optoelectronic characteristics of an organic light emitting diode according to the present invention.

Referring to FIGS. 1 and 2, the method for measuring optoelectronic characteristics of an organic light emitting diode is implemented by an apparatus including a computer 100, a power supply 102 and a cavity 104.

A tooling 108 is disposed in the cavity 104, and at least one photodiode 106 is mounted on the tooling 108 via a fixture lever 107. The photodiode 106 is coupled to the computer 100. Before performing the measurement, an organic light emitting diode 110 is disposed on the tooling 108. A fixture mechanism (not shown) is applied to fix the organic light emitting diode 110 on the tooling 108, preferably. The organic light emitting diode 110 includes an anode and a cathode coupled to the power supply 102, while the power supply 102 is coupled to the computer.

Figure 3:
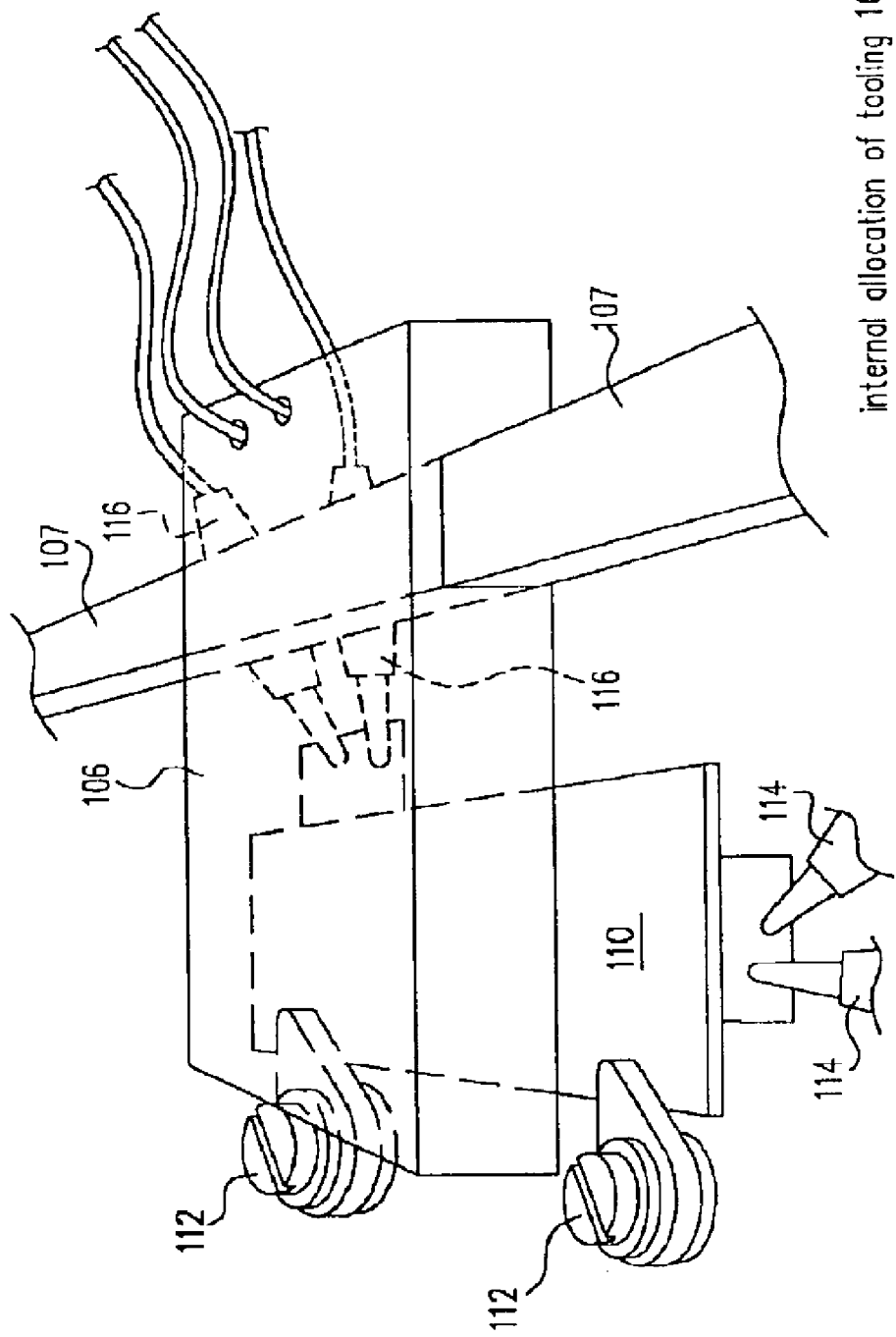
FIG. 3 shows the allocation of the tooling in the apparatus for measuring optoelectronic characteristics of an organic light emitting diode according to the present invention.

FIG. 3 shows the internal allocation of the tooling in the apparatus for measuring optoelectronic characteristics of an organic light emitting diode according to the present invention.

Referring to FIG. 3, the photodiode 106 is mounted on the tooling 108 via a fixture lever 107. A fixture 112 is disposed on the tooling 108 for fixing an organic light emitting diode 110 therein. The connecting lines 114 and 116 have one ends respectively connected to the cathode and anode of the organic light emitting diode 110 and the other ends connected to the power supply.

Referring to FIGS. 1 and 2, after fixing the organic light emitting diode 110 on the tooling 108 of the cavity 104, a high temperature, a high humidity or a high temperature and humidity condition is applied to the cavity 104. For example, the high temperature condition includes a temperature between 25° C. and 100° C., the high humidity condition includes a relative humidity of about 40 to about 100.

The computer 100 then controls the power supply 102 for supplying a constant current, voltage or other condition to the cavity 104, so as to light up the organic light emitting diode 110. Meanwhile, the photodiode 106 on the tooling 108 measures the brightness of the light generated by the organic light emitting diode 110. The brightness measured by the photodiode 106 is then carried by a signal input to the computer 100 for further data process. The data process includes a data processing step, a graph generating step or a statistics analyzing step.

In the present invention, the sampling time of the photodiode 106 on the tooling 108 is configured by the computer 100. That is, the timing for lighting up the organic light emitting diode 110, and the timing for delivering the measured signal to the computer 100 are determined by the computer 100.

The computer 100 is further configured to provide a constant current, voltage or other condition to the tooling 108 for every period of time for lighting up the organic light emitting diode 110, so as to measure the brightness of the light generated thereby. According to the measured brightness carried by the signal, the computer 100 performs further data process.

In the present Invention, the photodiode is disposed in the tooling of the cavity to monitor brightness variation of the OLED in real time. Compared to the conventional test machine requires moving in and out of the OLED, the labor and waiting time are significantly reduced. For example, the conventional measurement requires 2 operators per day, while the measurement provided by the present invention requires only one operator with quarter as much efforts per day. Therefore, labor can be reduced by four folds. Further, as the OLED need not be removed from the tooling for measuring the optoelectronic characteristics, the measurement accuracy of optoelectronic characteristics can be improved as there is no interruption in high temperature and high humidity conditions. Moreover, the present invention uses the computer to set up the measurement frequency, that is, the optoelectronic characteristics of the OLED are measured with a specific frequency, such that the minor variation can be monitored. In addition, the automatic measurement precludes the operators from being Injured by a direct contact with the high temperature and humidity.

Therefore, the present invention comprises at least the following advantages.

1. The present invention provides an automatic measurement of optoelectronic characteristics of an organic light emitting diodes, such that the labor is greatly reduced.

2. The present invention saves the waiting time for the decrease and increase of temperature, since removal of the organic light emitting diode is not required.

3. The measurement accuracy is enhanced since the high temperature and high humidity condition applied to the organic light emitting diode is not interrupted by the removal of the light emitting diode.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. An apparatus for measuring optoelectronic characteristics of an OLED, comprising:

a computer;

a power supply, coupled to the computer and being controlled thereby; and a cavity, further comprising:

a tooling for disposing an OLED therein, the OLED having an anode and a cathode coupled to the power supply; and at least one photodiode mounted on the tooling and coupled to the computer, the photodiode being controlled by the computer.

2. The apparatus according to claim 1, wherein the tooling further comprises a fixture lever for mounting the photodiode thereon.

3. The apparatus according to claim 1, wherein the tooling further comprising a fixture to fix the OLED thereon.

4. The apparatus according to claim 1, wherein the computer is operative to control a frequency of the power supply to supply current for lighting up the OLED.

5. The apparatus according to claim 1, wherein the computer is operative to control a sampling time of the photodiode.

6. The apparatus according to claim 1, wherein the cavity is controlled with a temperature between 25° C. and 100° C.

7. The apparatus according to claim 1, wherein the cavity is controlled with a relative humidity between 40% and 100%.

8. An apparatus for measuring optoelectronic characteristics of an OLED, comprising:

a computer;

a power supply coupled to the computer and controlled thereby; and a tooling and a photodiode mounted thereon, the photodiode being coupled to the computer and controlled thereby, the tooling being operative to dispose an OLED therein, and the OLED having an anode and a cathode coupled to the power supply.

9. The apparatus according to claim 8, further comprising a fixture lever for mounting the photodiode on the tooling.

10. The apparatus according to claim 8, further comprising a fixture for disposing the OLED in the tooling.

11. The apparatus according to claim 8, wherein the computer is operative to control a frequency for lighting up the OLED by the power supply.

12. The apparatus according to claim 8, wherein the computer is operative to control a sampling time of the photodiode.

* * * * *